US010163313B2

(12) United States Patent
Subramanian et al.

(10) Patent No.: US 10,163,313 B2
(45) Date of Patent: Dec. 25, 2018

(54) SYSTEM AND METHOD FOR SOUND BASED SURVEILLANCE

(71) Applicant: Tata Consultancy Services Limited, Mumbai (IN)

(72) Inventors: Sivakumar Subramanian, Pune (IN); Sunil Kumar Kopparapu, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 29 days.

(21) Appl. No.: 15/457,747

(22) Filed: Mar. 13, 2017

(65) Prior Publication Data
US 2018/0225939 A1 Aug. 9, 2018

(30) Foreign Application Priority Data

Mar. 14, 2016 (IN) .............................. 201621008860

(51) Int. Cl.
| G08B 13/16 | (2006.01) |
| G08B 3/10 | (2006.01) |
| G08B 21/04 | (2006.01) |
| G06N 5/02 | (2006.01) |
| G08B 21/02 | (2006.01) |
| G08B 25/00 | (2006.01) |
| G08B 29/18 | (2006.01) |

(52) U.S. Cl.
CPC ......... G08B 13/1672 (2013.01); G06N 5/022 (2013.01); G08B 3/10 (2013.01); G08B 21/02 (2013.01); G08B 21/0423 (2013.01); G08B 21/0438 (2013.01); G08B 21/0469 (2013.01); G08B 25/001 (2013.01); G08B 29/186 (2013.01); G08B 21/0415 (2013.01)

(58) Field of Classification Search
CPC . G10L 21/0208; G10L 25/78; G10L 21/0216; G10L 25/30; G08B 21/02; G08B 21/043; G08B 13/16; G08B 29/18; G08B 25/00; G08B 21/04; G06N 5/02
See application file for complete search history.

(56) References Cited

U.S. PATENT DOCUMENTS 6,640,145 B2 * 10/2003 Hoffberg ............ G05B 19/0426
700/17
7,006,881 B1 * 2/2006 Hoffberg ................ G05B 15/02
700/17

(Continued)

FOREIGN PATENT DOCUMENTS

CN 102881284 A 1/2013

*Primary Examiner* — Fekadeselassie Girma
(74) *Attorney, Agent, or Firm* — Finnegan, Henderson, Farabow, Garrett & Dunner LLP

(57) ABSTRACT

A system and method to detect an event by analyzing sound signals received from a plurality of configured sensors. The sensors can be fixed or mobile and sensor activity is tracked in a sensor map. The frame analyzer of the system compares sound signals received from the sensors and applies knowledge data to determine if any deviation observed can be determined to be an uncharacteristic event. A rule data set comprising priority data, type of event, location is applied to the output of the frame analyzer to determine if the uncharacteristic sound observed is an event. On detection of an event, alerts are issued to appropriate authority. Further, sound frame and contextual data associated with the event are stored to serve as continuous learning for the system.

13 Claims, 4 Drawing Sheets

(56) References Cited

U.S. PATENT DOCUMENTS

| | | | | |
|---|---|---|---|---|
| 9,852,620 | B1* | 12/2017 | Hoeft | G08C 23/02 |
| 2003/0158795 | A1* | 8/2003 | Markham | B23Q 35/12 |
| | | | | 705/28 |
| 2005/0004797 | A1* | 1/2005 | Azencott | G08B 13/1672 |
| | | | | 704/226 |
| 2005/0254440 | A1* | 11/2005 | Sorrell | H04L 29/06027 |
| | | | | 370/264 |
| 2008/0025477 | A1* | 1/2008 | Farhan | G06Q 50/22 |
| | | | | 379/38 |
| 2008/0189104 | A1* | 8/2008 | Zong | G10L 21/02 |
| | | | | 704/226 |
| 2009/0248411 | A1* | 10/2009 | Konchitsky | G10L 15/20 |
| | | | | 704/242 |
| 2011/0191101 | A1* | 8/2011 | Uhle | G10L 21/0208 |
| | | | | 704/205 |
| 2011/0282663 | A1* | 11/2011 | Talwar | G10L 15/20 |
| | | | | 704/233 |
| 2012/0303369 | A1* | 11/2012 | Brush | G10L 17/02 |
| | | | | 704/246 |
| 2014/0198098 | A1* | 7/2014 | Joo | H04N 13/0018 |
| | | | | 345/419 |
| 2015/0379355 | A1* | 12/2015 | Kanga | G08B 13/19671 |
| | | | | 382/103 |
| 2017/0124834 | A1* | 5/2017 | Pedersoli | H04W 4/90 |
| 2018/0144605 | A1* | 5/2018 | Kusens | G08B 21/22 |

\* cited by examiner

Figure 1: Network Enablement
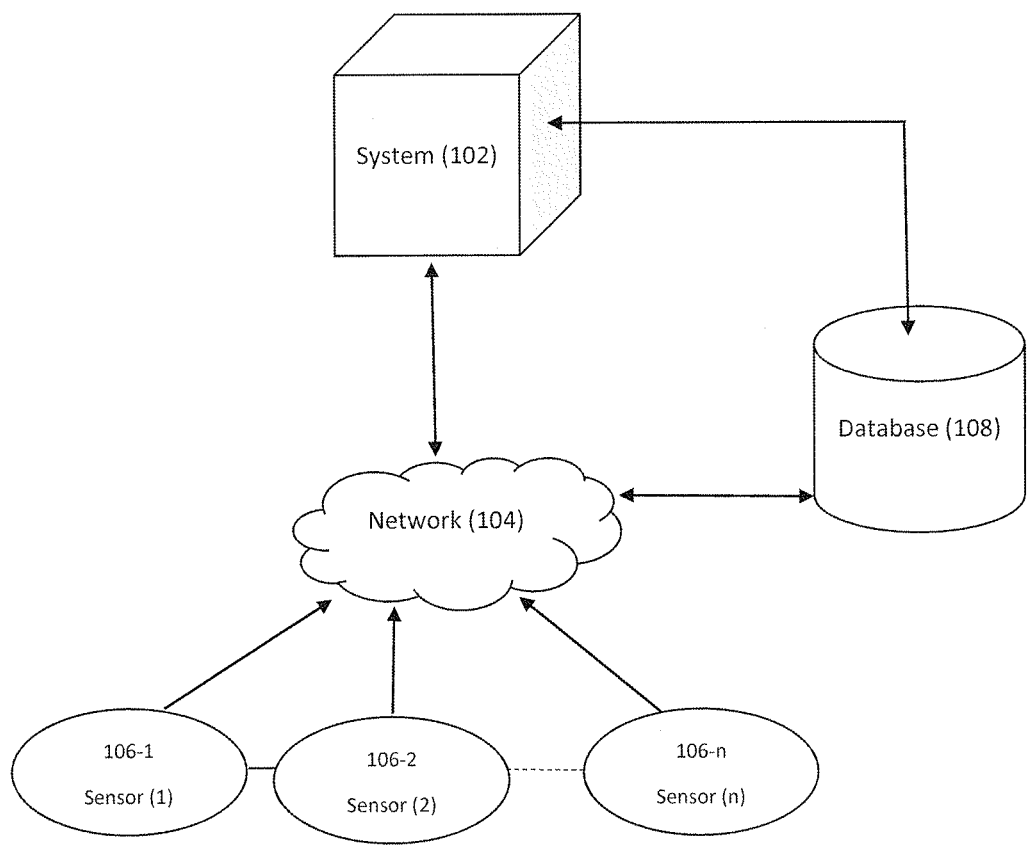

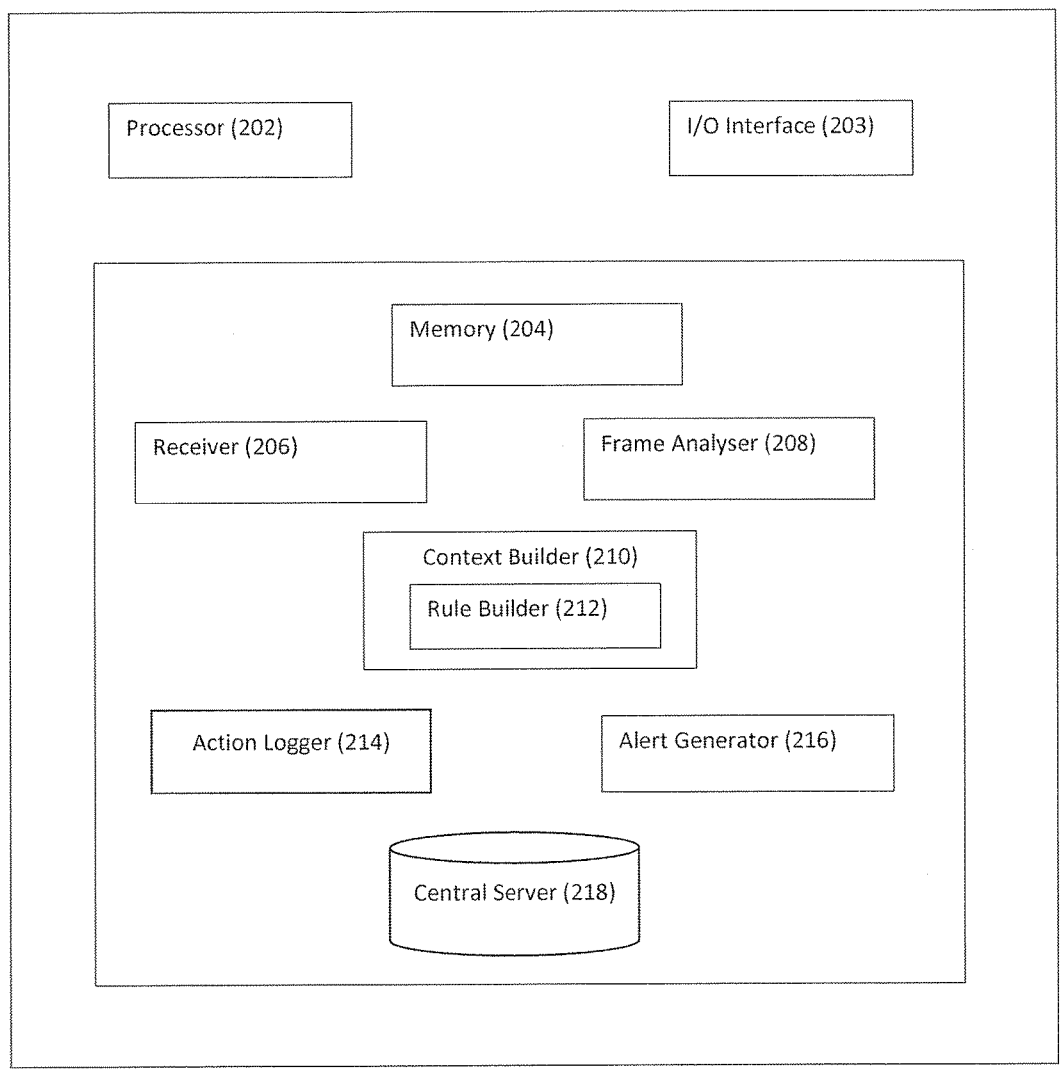
Figure 2: System Diagram (102)

Figure 3: Method Steps
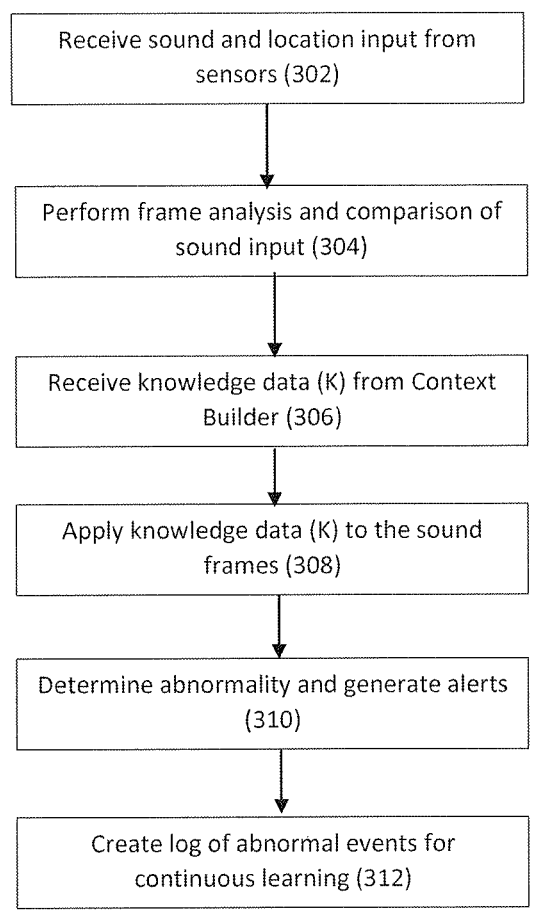

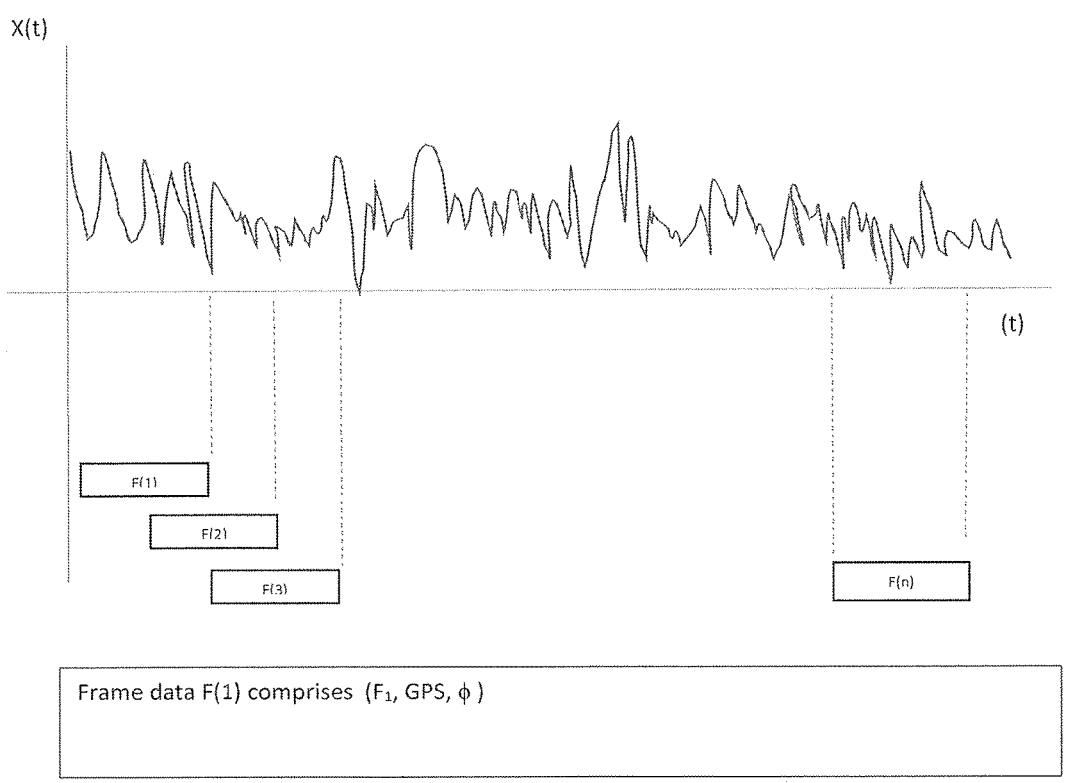

SYSTEM AND METHOD FOR SOUND BASED SURVEILLANCE

PRIORITY CLAIM

This application claims priority under 35 U.S.C.§ 119 from India Application No. 201621008860, filed on Mar. 14, 2016. The entire contents of the aforementioned application are incorporated herein by reference.

TECHNICAL FIELD

The embodiments herein generally relate to a system and method for surveillance, and more particularly, to a system and method for surveillance of an environment by sensing and analyzing sound signals in the ambience.

BACKGROUND

It is becoming increasingly important to be vigilant to protect human lives and assets, especially in public spaces such as bus stops, railway stations, airports, hospitals, schools. Surveillance techniques have been employed in the past and this mostly consisted of capturing video based evidence. This means, setting up infrastructure that is needed to capture videography and also employ processing techniques to gather vital information.

Audio based methods are an alternate technique that can be used to monitor environments to improve safety and security with reliability. In addition audio based methods can provide invaluable support to the surveillance efforts. Another benefit is relatively lower cost in setting up an audio based infrastructure.

Currently available audio-based surveillance systems work on pattern matching, where the temporal patterns of different sounds that occur repeatedly in an environment are learnt. There is typically a reference databank of temporal pattern of sounds corresponding to known events. One technique describes a system and method to record recurring sounds in an ambient environment, and these sounds are compared with sounds pre-captured in a reference database. For instance, sounds that co-respond to a regular routine in a day—such as opening and closing of doors, sound of water boiling, movement of people at a particular time and so on. Count of sound occurrences are maintained and any deviation from a pre-defined threshold is marked as an abnormal, for instance if kettle boils at 7 am instead of 6:30 am, if the door opening sound is less than a pre-defined frequency. Visual information such as an output from a video camera for the environment are used to co-relate any detected abnormality.

Yet another known method is to survey sounds emanating from a target environment, and capture these to create a preparatory database, wherein these are further studied by operators who will use the system. The method further describes how an operator will mark a sound heard in a real scenario and also signals the type of scenario. For instance, sound of glass breaking, or a gun shot in the audio and marked as a deviation. A spectral analysis is performed for the location where the sound is heard and this is compared with similar sounds recorded in the preparatory database to identify events. The process comprises identification of similar sounds and performing a match operation in a reference database before marking it as a definite abnormality.

Often, these systems are unable to raise an alarm in real-time, especially if the event requires the analysis of a temporally lengthy sound signal further, there are false negatives for an alarm raised just because an activity or an event may not be in the exact sequence for a set of activities matched from the reference database. Some of the limitations of existing audio based systems are that they need to be extensively trained to detect what is an uncharacteristic sound and what is not. Secondly, a sound that is normal around some time of the day may not necessarily be normal during some other time of the day or when occurring with another event. Also, current systems do not consider use of mobile sources of sound input.

There is a need for a system to automatically identify an event based on sound superimposed by the inputs about the context. Here the context may mean, time, position or setting of the observation, pre-existing knowledge such as train schedules in a train station, class schedules in a school, etc. Identification of an event should also be determined through self-learning processes configured in the system.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In the view of the foregoing, an embodiment herein provides a computer implemented system for determining an event in an ambient environment. The computer implemented system comprising of a receiver (206) to receive input signals from a configured sensor network, a frame analyzer (208) to create and compare sound frames for predefined time intervals from input signals received by the receiver, a context builder (210) to associate contextual information to sound frames, a rule builder (212) to process temporal sound frames with inputs from the frame analyzer and context builder and determine an event, an alert generator (216) to flag an event and generate alerts, an action logger (214) to capture event related data; and a central server (218) to store sound signatures of events, related contextual information for continual learning of the said system.

The receiver (206) is further configured to receive a sound signals from a network of sensors. The sound signals are received from a combination of fixed and mobile sensors.

In an embodiment, the system further comprises a frame analyzer (208) to generate sound frames and incorporate knowledge data to further compare adjacent sound frames to detect uncharacteristic sound or an event. The system further comprises a context builder (210) to store a plurality of context data, which is further a subset of knowledge data that is input to the frame analyzer (208) to determine uncharacteristic sound.

The system further comprises a rule builder (212) to create rule data that are applied to the context data to further determine if an uncharacteristic sound detected by the frame analyzer (208) can be flagged as an event. The rule data is input to the rule builder (212), which further comprises location data, event priority, time data and sound attribute to further determine if an uncharacteristic sound detected by the frame analyzer (208) can be flagged as an event.

In an embodiment, the system further comprises an alert generator (216) to generate alerts through a plurality of communication means to authorities to alert of any event in the environment. The system also comprises an action logger (214) to record the time, location and priority of an event. Further, the action logger (214) also records the sound frame in which uncharacteristic sound was detected, and said time, location, priority and sound data is recorded as an event and stored in the Central Server (218).

In an aspect, there is provided a computer implemented method for determining a sound signature of an ambient environment, the method comprising receiving, by a receiver (206), sound data from a plurality of sensors configured to be in a network; creating and analyzing sound frames, by a frame analyzer (208) for signals received by the receiver (206); creating a rule data, by a rule builder (212) to be a part of contextual data set; associating a contextual data set, by a context builder (210) to the sound frames to determine an event; generating an alert, by an alert generator to flag an event; recording details of an event, by an event logger to record time, location, type and priority of an event for continuous learning; and storing sound signature, by a central server (218) for continual learning.

In yet another aspect, the step of creating and analysing sound frames comprises comparing adjacent sound frames and association of at least one contextual data to determine an event.

In yet another aspect, the step of creating a rule data further comprises creating a rule consisting elements of time, location, priority and a sound attribute, which will be associated with contextual data set.

In an embodiment, the step of generating an alert by an Alert Generator comprises usage of a communication means to notify authorities of an event along with its description, time, location and priority. Additionally, the step of recording details if an event by an event logger comprises storage of time, location, type, priority and sound frame of an event for continuous learning.

BRIEF DESCRIPTION OF THE DRAWINGS

The embodiments herein will be better understood from the following detailed description with reference to the drawings, in which:

FIG. 1 illustrates a configuration of the computer implemented system for detection of sound signature in a networked environment.

FIG. 2 depicts a detailed computer implemented system for detection of sound signatures, according to the embodiments disclosed herein.

FIG. 3 illustrates a flow diagram for a computer implemented method for detection of a sound signature in an ambient environment of FIG. 2, according to the embodiments as disclosed herein.

FIG. 4 illustrates an embodiment to create and compare sound frames to detect an uncharacteristic sound.

It should be appreciated by those skilled in the art that any block diagram herein represent conceptual views of illustrative devices embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those with skill in the art to practice the embodiments herein. Accordingly, the examples should not be construed as limiting the scope of the embodiments herein.

The words "comprising, " "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a, " "an," and "the" include plural references unless the context clearly dictates otherwise. Although any devices and methods similar or equivalent to those described herein can be used in the practice or testing of embodiments of the present disclosure, the preferred, devices and methods are now described.

Some embodiments of this disclosure, illustrating all its features, will now be discussed in detail. The disclosed embodiments are merely exemplary of the disclosure, which may be embodied in various forms. Before setting forth the detailed explanation, it is noted that all of the discussion below, regardless of the particular implementation being described, is exemplary in nature, rather than limiting.

Referring now to the drawings, and more particularly to FIGS. 1 through 4, where similar reference characters denote corresponding features consistently throughout the figures, there are shown preferred embodiments and these embodiments are described in the context of the following exemplary device and method.

FIG. 1 illustrates network enablement of the system (102) determine an uncharacteristic sound associated with an activity in an ambient environment. In an embodiment, the system (102) is connected to a network (104) to facilitate multiple communications within a wide variety of networks and protocol types, including wired networks, for example, LAN, cable, etc., and wireless networks, such as WLAN, cellular, or satellite to a configured network of sensors.

FIG. 2 illustrates various modules of the system (102) to determine an uncharacteristic sound. Sound-based surveillance and its embodiment described herein directly reports patterns through a learning method. In an embodiment, the system includes one or more processors, communication interface or input/output (I/O) interface, and memory or one or more internal data storage devices (not shown) operatively coupled to the one or more processors. The one or more processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, system can be implemented in a variety of computing systems, such as a laptop computer, a desktop computer, a notebook, a workstation, a mainframe computer, a server, a network server, cloud, hand-held device, wearable device and the like.

The I/O interface can include a variety of software and hardware interfaces, for example, a web interface, a graphical user interface, and the like and in an embodiment, the I/O interface can include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the various modules of the device 200 can be stored in the memory.

The system (102) as illustrated in FIG. 2 comprises a plurality of modules that determine an event through data processing. The receiver (206) receives input signals from the ambience through a configuration of networked sensors. Sensors may be attached to non-moving asset or a location or alternately could be attached to a moving asset. Location data may be gathered in absolute terms like GPS or could be inferred approximately based on the sounds transmitted from different sensors. A frame analyzer (208) generates sound frames for a defined time interval (t). The generated frames are processed to identify events. A context builder (210) comprises data elements—time data, location data—which is GPS data and a knowledge component-these data elements stored in the central server (218) are used for continuous learning in the system, with one of the objectives being to reduce false positives. The context builder (216) provides the knowledge component which is the contextual information relevant at that point in time for the ambient environment to determine the event. An action logger (214) records data pertaining to an alert event. An alert generator (218), on receiving indication of an event generates an alert communication to external devices and systems.

The steps of the computer implemented method of the present disclosure will now be explained with reference to the components of the system (102) as depicted in FIG. 2. At step 302, the Receiver (206) receives an input signal. The input signal received by the Receiver (206) comprises sound signal received from a configured sensor network and location data—latitude/longitude data from a GPS to indicate or construct a relative map of the area under surveillance. In an embodiment, an area could be that of a school and a relative map generated could be of classrooms, libraries, dining area, and playground and so on.

The Receiver (206) receives signals from a plurality of sensors (shown in FIG. 1) that are configured to be in a network. In an embodiment, sensors can be fixed or mobile. Fixed sensors are affixed to a particular location in the ambient area. In an embodiment, fixed sensors are placed in classrooms, libraries, cafeterias and so on. Mobile sensors are present with the subject, for instance a wearable—in an embodiment, a mobile sensor can be worn by the school staff or students to capture ambient sound. It is pertinent to note that for mobile sensor configuration, location information can change and this is constantly updated by the system. In an embodiment, wherein a system is used in a school environment, sensors are placed in fixed locations—classrooms, common areas etc. In yet another embodiment, mobile (wireless) sensors are fixed on student ID cards, or personal wearable objects such as watches and every student and staff also wears a sensor. In a further embodiment, the movement of a school staff wearing a sensor may be tracked to confirm to the prescribed schedule by the Central Server (218).

In an exemplary embodiment, a sensor map is created by the receiver (206) and stored in the central server (218). The sensor map indicates for compartmentalized areas of the ambient environment, and the sensors that are active for a given area in an ambient environment.

The active sensors for an area are marked as a cluster of sensors in the sensor map generated by the receiver (206). In an exemplary embodiment, the sensor map indicates a cluster of sensors placed at different areas of a school such as a playground, library, assembly area, laboratory, classrooms, washrooms, staff rooms. The sensor map indicates the number and identities of fixed and mobile sensors that are present for a given area in the ambient environment.

In an embodiment, sensors—both mobile and fixed are labelled for identification of location within the premises. For instance, students of class 1 will have sensors that indicate that they belong to a dynamic group for class 1. One of the objectives of sensor placements and clusters is to determine and monitor their location. In an embodiment—both fixed and mobile sensors receive inputs from the location inside the school. For instance, some students of class 1 and class 2 could be aggregated because they learn the same elective subject. The sensor map will indicate movement of sensors from Class 1 and movement of sensors from Class 2 to a new location within the school premises which is to be monitored. The central server (218) will receive sound inputs from all the sensors of types fixed and mobile to enable the monitoring of their contexts.

The receiver (206) collates inputs from the mobile sensors and fixed sensors and creates the sensor map. In addition, the inputs received from all sensors are also stored in the central server (218). If a group of mobile sensors are located close to a fixed sensor, then the sound received or rather processed frames will be strongly correlated. In an embodiment, if a class is in progress, mobile sensors worn by students and the fixed sensor placed in the classroom will transmit similar sound signals, which is analyzed by the frame analyzer (208).

In yet another embodiment, the monitoring of mobile sensors can be activated and de-activated by the central server (218) as they come into or go out of the monitored zone and this will be reflected in the sensor map. A monitored zone is an area within the environment that is being monitored for occurrence of an event. In an embodiment, a library or the bus parking lot can be a monitored zone. For instance, a sensor can be configured to switch off once a child leaves the school bus. Sensor activation and de-activation helps in monitoring only sensors that are present in a monitored zone. In a different embodiment, if one or two sensors from a cluster of mobile sensors do not show signs of activity, it could signal an event or be a cause for concern.

With reference to step 304, the sound signals from a cluster of sensors are received by the receiver (206) and further transmitted as sound input to a frame analyzer (208) for frame analysis and comparison.

At step 304, on receiving signals from a cluster of sensors, the frame analyzer (208) creates sound frames of the captured sound signals over a time period t(k). The sound frames are coupled with location data, and context data from the context builder (210)—collectively termed as knowledge data set ($\phi$). Temporal signal x(t) is analyzed across a time period t(k) into distinct overlapping time frames F. Each frame comprises temporal sound signal and knowledge data (K)—(location data and contextual data). Each frame is represented as:

$$F(t) = \{(F1, K), (F2, K), \ldots (FN, K)\}$$

Refer to FIG. 4, which comprises sound data received by the receiver (206) analyzed by the frame analyzer (208) to compare adjacent frames. In the present embodiment, the frame analyzer (208) compares sound frames. A set of adjacent frames are compared—in this embodiment, (F1, F2, F3) is compared with (F2, F3, F4), . . . (Fn−1, Fn, Fn+1). Deviations between sound frames are recorded in the central server (218) and high deviations observed between successive frames, signals the possibility of an event, which is marked at time interval t(k). In an embodiment, frame analysis comprises generating sound frames for time t(k) from the sound signals for a frame comprising frame data. Further, frame data comprises various attributes of the sound signal in association with a knowledge data. In an embodiment, knowledge data further comprises contextual data and location data. Location data is derived from the sensor map, generated by the Receiver (206). Referring to FIG. 4, frames are created for time t(k), and these frames are compared for an overlapping time between two adjacent frames to determine in sound attributed being processed.

In an embodiment, the frame analyzer (208) observes attributes of sound signals—Zero crossing rate (ZCR), Energy, pitch, formant, Linear Prediction Coefficients (LPC), Linear Prediction Cepstrum Coefficients (LPCC), Mel-Frequency Cepstrum Coefficients (MFCCs)+delta MFCC+delta-delta-MFCC, Perceptual Linear Prediction Cepstral Coefficients (PLPCC) harmonic cepstral coefficients (HCC), and perceptual harmonic cepstral coefficients (PNCC)

At this stage, a superimposition with contextual knowledge is essential to determine probability of occurrence of an uncharacteristic event. At step 306, knowledge data (K) comprising a knowledge data set (φ) is collated from the context builder (210). With reference to FIG. 2, the context builder (210) further comprises a rule builder (212) to create rules that are used to correlate with the knowledge data set (φ) and the deviation in sound signal analysed by the frame analyzer (208).

In an embodiment, the Rule builder (212) creates a rule set that is superimposed on the output of the frame analyzer (208). The Rule builder (212) comprises rules that can be defined based on the attributes of activity of the cluster of sensors, time of the day, location, schedule information and sound signal attributes. In addition, a priority can be set to defined levels such as Low, Medium, High or Emergency so that an event is flagged. The rule builder (212) is used to create a supervised learning model to determine an event. A combination of rules can be applied. In an embodiment, if there are multiple rules that can be applied for location, for instance a playground and time between 3 pm and 5 pm, all those rules are part of the context to determine the probability of occurrence of an event.

TABLE 1

Attributes for Rule Building

| Attribute | Values |
| --- | --- |
| Sensor | Sensor ID |
| Group | Ex: Class-1; Elective = French, etc. |
| Sensor Type | Ex: Fixed or Mobile |
| Priority | Ex: High\|Medium\|Low |
| Time | Ex: 12 pm to 2 pm |
| Location | Ex: Playground or assembly, classroom, cafeteria |
| Day | Ex: specify time schedule |
| Sensor Map Intensity | Correlate with sensor map, cluster of sensors and location |
| Time duration of deviation | Correlate with time duration for which noise was observed during fame comparison |

TABLE 1-continued

Attributes for Rule Building

| Attribute | Values |
| --- | --- |
| Schedule | Correlate with time, activity mentioned in the schedule |
| Sensor Position | Correlate with position of mobile sensors and fixed sensor in the sensor map/monitored zone - position of admin staff and position of sensors worn by students |

Refer to Table 1 for sample attributes that can comprise a rule in the Rule builder (212)

In an exemplary embodiment, a rule could be configured to indicate that an area such as a playground, where students of class 8 have play time and the time of day is noon, then any deviation in sound signal can be marked as low priority and not an abnormal event, as it has been observed that this is play time. In yet another embodiment, a rule could be configured such that for art class, if students from one sensor cluster move to another sensor cluster, then priority can be low because of schedule information—students from different classes will come together for the class.

In yet another embodiment, a rule could be configured such that there is a deviation in sound signal for the bus parking area after 5 pm, priority accorded for the event should be high, as there could be chances that a school child is left behind and attention from school is required. Similarly, in yet another embodiment, a rule could be created such that for any Saturday or Sunday or school holiday, priority should be very high for any deviation in sound signal. Rules created are observed over time, and these rules can be modified or edited based on patterns observed.

In step 308, the knowledge data set (φ) is applied along with rules from the rule builder (212) and contextual data. If there is a sudden change in sound signal—for instance, increase in amplitude, change in emotion, sound of breaking etc., should be a cause of alarm. It is critical to determine when an uncharacteristic sound is heard in these environments and how quickly can these be identified and an alert can be issued. In the present embodiment, contextual knowledge can comprise schedule for a school, and various classes, and a schedule for a student/faculty or administrators. Schedule can be obtained from a central server (218) that is managed by the school administration. In an embodiment, if a sudden deviation in sound is detected for a cluster of sensors from a classroom for Class 8, the schedule for Class 8 is first obtained from the central server (218), and applicable rules from the rule builder (212) are applied. In an embodiment, for sound deviation where location is playground and time is between 4 pm and 5 pm, and priority accorded is low, the sound deviation observed is not marked as an event. In yet another embodiment, for a rule where: location is cafeteria time is between 12 pm and 2 pm, and if sound deviation is for time more than 30 secs priority is high for uncharacteristic sound signature. A sound deviation for long time duration indicates probability of a possible accident/incident. In yet another embodiment, if a mobile sensor (attached to a student) is seen as a lone object in a sensor map, an event alarm can be triggered.

In step 310, subsequent to application of rule, an event is flagged by the alert generator (214). The alert generator (214) invokes communication means such as a pager, mobile phone to an authority. In the present embodiment, the alert generator (214) will invoke communication means to inform the school administration. Further in step 312, the distinct sound deviation observed by the frame analyzer (208) is recorded and stored in the central server (218) as an event signature, along with supporting knowledge data set of the ambience—time, location, priority. In addition, a type of event is also added as a descriptor. In an embodiment, type of event could be accident in cafeteria, child left behind and so son. These frame with sound deviation and supporting knowledge data set is recorded in the action logger (214). These details form a repository of elements that are critical to continuous learning of the system.

In an embodiment, context data, knowledge data—comprising time, location and priority accorded to the event is recorded in the central server (218) for continual learning. The detection of an event is also co-related with the rule that is applied by the Rule builder (212).

In an embodiment, the system maps events to the rules applied from the rule builder (212). Priority of event and type of event data is abstracted for the event detected. This mapping enables the system to perform continuous learning. In yet another embodiment, mapping of event to rules, priority aids the system to identify an event. For instance, if a deviation in sound is detected by the frame analyzer (208) after feature extraction of sound signal, location data and knowledge data is determined to be library, and sensor map determines 2 active sensors in the area after time 3 pm, the system can automatically mark the event as an event that is to be investigated. This judgment from the system is triggered as a result of multiple rule applications from the rule builder (212).

Thus, in accordance with the present disclosure, analysis of sound signals to determine an event can be determined with the help of context sensitive data for an environment. Frame analysis for a different sound frames are performed to detect deviation and the observed deviation is further co-related with context data.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The system may also include software means. Alternatively, the system of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the device of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A system to detect events by monitoring sound signals of an environment, wherein the system comprises:
    a processor; and
    a memory coupled to the processor, wherein the memory has a plurality of modules stored therein that are executable by the processor, the plurality of modules comprising:
        a receiver to receive input signals from a configured sensor network, wherein the input signals comprises a combination of sound signals and location data of the environment;
        a frame analyzer to create and compare sound frames for predefined time intervals from the input signals received by the receiver;
        a context builder to associate contextual information and apply at least one rule from a rule builder to the sound frames to determine the context, wherein the rule builder comprises a configured rule data having rule elements of location, time, sound attributes and a priority;
        an alert generator to flag an event, generate alerts and communicate with authorities regarding the event;
        an action logger to record the at least one sound associated with the event and contextual information associated with the event in the central server; and
        a central server to store at least one sound frame and contextual information of the event, for continual learning.

2. The system as claimed in claim 1, wherein the configured sensor network comprises a network of fixed and mobile sensors, wherein the mobile sensors further comprise wearable devices affixed to an object being monitored in the environment.

3. The system as claimed in claim 1, wherein the receiver on receiving input signals from the configured sensor network, creates a sensor map to indicate sound activity of a cluster of sensors in monitored zone of the environment.

4. The system as claimed in claim 1, wherein the frame analyzer compares adjacent set of sound frames (F1, F2, . . . FN) comprising knowledge data (K) to determine deviation in sound signals and time (t) of occurrence.

5. The system as claimed in claim 1, wherein the configured rule data can be modified or re-configured based on observed sound signals.

6. The system as claimed in claim 1, wherein the alert generator signals an alert on the sensor map generated by the receiver.

7. A computer-implemented method to detect events by monitoring sound signals of an environment, wherein the method comprises:
   receiving, by a receiver, at least one input signal from a configured sensor network;
   creating and analysing sound frames, by a frame analyzer for the at least one input signal received by the receiver, wherein creating and analysing sound frames comprises generating a set of sound frames and comparing adjacent set of sound frames with knowledge data set over time (t) to determine an event;
   associating a contextual data set, by a context builder to the sound frames to determine an event;
   generating at least one alert, by an alert generator to flag an event;
   recording details of an event, by an event logger to record time, place, type and priority of an event for continuous learning; and
   storing at least one sound frame and associated contextual data, by a central server for continual learning.

8. The computer implemented method as claimed in claim 7, wherein the at least one input signals comprises a combination of sound signals and location data.

9. The computer implemented method as claimed in claim 7, wherein the receiving of input signals by the receiver further comprises creation of a sensor map to indicate monitored zone of the environment indicating sound activity of a cluster of networked sensors.

10. The computer implemented method as claimed claim 7, wherein associating of a contextual data set comprises superimposing contextual data set, wherein the contextual data set further comprises a schedule, time of the day, priority, sound activity from sensor map and application of at least one rule to the sound frames being compared.

11. The computer implemented method, as claimed in claim 10, wherein the application of at least one rule further comprises creating of a rule data, wherein the rule data further comprises at least one of schedule, location, time of the day, sound attributes and assigning of a priority.

12. The computer implemented method as claimed in claim 7, wherein, generating an alert comprises indicating an alert on the sensor map for a cluster of sensors and communicating to authorities via communication means.

13. A computer program product comprising a non-transitory computer readable medium having a computer readable program embodied therein, wherein the computer readable program, when executed on a computing device causes the computing device to:
   receive at least one input signal from a configured sensor network;
   create and analyse sound frames for the at least one input signal received, wherein creating and analysing sound frames comprises generating a set of sound frames and comparing adjacent set of sound frames with knowledge data set over time (t) to determine an event;
   associate a contextual data set to determine an event;
   generate at least one alert to flag an event;
   record details of an event pertaining to time, place, type and priority of an event for continuous learning; and
   store at least one sound frame by a central server for continual learning.

\* \* \* \* \*